(12) United States Patent
Shu (10) Patent No.: US 8,611,924 B2
(45) Date of Patent: Dec. 17, 2013

(54) PROCESSOR, APPARATUS AND ASSOCIATED METHODS FOR UNLICENSED USE OF WHITE SPACE

(75) Inventor: Kodo Shu, Beijing (CN)

(73) Assignee: Nokia Corporation, Espoo (FI)

( * ) Notice: Subject to any disclaimer, the term of this patent is extended or adjusted under 35 U.S.C. 154(b) by 10 days.

(21) Appl. No.: 13/393,434

(22) PCT Filed: Aug. 26, 2009

(86) PCT No.: PCT/EP2009/006180
§ 371 (c)(1),
(2), (4) Date: Feb. 29, 2012

(87) PCT Pub. No.: WO2011/023206
PCT Pub. Date: Mar. 3, 2011

(65) Prior Publication Data
US 2012/0157119 A1    Jun. 21, 2012

(51) Int. Cl.
*H04W 24/00*    (2009.01)

(52) U.S. Cl.
USPC ........................................ 455/456.1; 370/328

(58) Field of Classification Search
USPC ................ 455/422.1, 432.1, 432.3, 433, 434, 455/435.1–444, 456.1–456.6, 457; 370/331, 328
See application file for complete search history.

(56) References Cited

U.S. PATENT DOCUMENTS

| | | | |
|---|---|---|---|
| 5,978,678 A * | 11/1999 | Houde et al. ................... | 455/433 |
| 6,952,581 B2 * | 10/2005 | Sasada et al. ............... | 455/432.3 |
| 2008/0056190 A1 * | 3/2008 | Kim .............................. | 370/331 |
| 2008/0207191 A1 * | 8/2008 | Fleenor et al. ............. | 455/422.1 |
| 2009/0011788 A1 | 1/2009 | Shan et al. | |
| 2009/0258645 A1 * | 10/2009 | Ramkull et al. .............. | 455/434 |
| 2011/0007226 A1 * | 1/2011 | Shintani et al. ............... | 348/735 |

FOREIGN PATENT DOCUMENTS

WO    2009/018300 A1    2/2009

OTHER PUBLICATIONS

Mick, "Despite DTV Delay White Spaces Supporters Continue Progress", DailyTech, Retrieved on Apr. 24, 2013, Website available at : www.dailytech.com/article.aspx?newsid=14186.
Cavanaugh et al., "FCC Opens Broadcast TV White Space Spectrum to Unlicensed Device Use", Retrieved on Apr. 24, 2013, Website available at : www.dwt.com/advisories/FCC_Opens_Broadcast_TV_White_Space_Spectrum_to_Unlicensed_Device_Use_11_20_2008/.
"Google Announces Companies in White Spaces Database Group", TV Technology, Retrieved on Apr. 24, 2013, Website available at : www.tvtechnology.com/news/0110/google-announces-companies-in-white-spaces-database-group/200915.
Reardon, "White-Space Spectrum Debate Rages", CNET News, Retrieved on Apr. 24, 2013, Website available at : news.cnet.com/White-space-spectrum-debate-rages/2100-1034_3-6202753.html.
Reardon, "FCC Opens Free White Space Spectrum", CNET News, Retrieved on Apr. 24, 2013, Website available at : news.cnet.com/8301-1035_3-10082505-94.html.

(Continued)

*Primary Examiner* — Phuoc H Doan
(74) *Attorney, Agent, or Firm* — Locke Lord LLP (57) ABSTRACT

A processor for a device, the processor configured to determine a current geographical area for the current device location within which geo-specific spectrum usage data are known; determine a geographical margin for the current geographical area, the geographical margin defining an outer area of the geographical area; and obtain geo-specific spectrum usage data corresponding to an adjacent geographical area from a location remote to the device when the device location is within the geographical margin.

16 Claims, 9 Drawing Sheets

(56) References Cited

OTHER PUBLICATIONS

Lasar, "White Spacers Press FCC On Database Plan", Ars Technica, Law & Disorder/Civilization & Discontents, Retrieved on Apr. 24, 2013, Website available at : arstechnica.com/tech-policy/2009/03/white-spacers-press-fcc-on-database-plan/.

Reardon, "Google Helps Form White Space Database Coalition", CNET News, Retrieved on Apr. 24, 2013, Website available at : news.cnet.com/8301-1035_3-10158326-94.html.

Clarke, "GooSoft Shapes Super White Space Database", The Register, TV technology bits battle, Retrieved on Apr. 24, 2013, Website available at : www.theregister.co/uk2009/02/04/white_spaces_database/.

International Search Report and Written Opinion received for corresponding International Application No. PCT/EP2009/006180, dated Mar. 26, 2010, 15 pages.

Kandeepan et al., "Bayesian Tracking In Cooperative Localization For Cognitive Radio Networks", 69th IEEE Vehicular Technology Conference, Apr. 26-29, 2009, pp. 1-5.

Stevenson et al., "IEEE 802.22: The First Cognitive Radio Wireless Regional Area Network Standard", IEEE Communications Magazine, vol. 47, Issue No. 1, Jan. 2009, pp. 130-138.

* cited by examiner

PROCESSOR, APPARATUS AND ASSOCIATED METHODS FOR UNLICENSED USE OF WHITE SPACE

RELATED APPLICATION

This application was originally filed as Patent Cooperation Treaty Application No. PCT/EP2009/006180 filed Aug. 26, 2009.

TECHNICAL FIELD

The present disclosure relates to the field of white-space devices, associated methods, computer programs and apparatus, and in particular concerns the aspects of use for managing connections when connecting to a database server from a mobile/portable electronic device. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

For the purposes of telecommunication, national and international bodies assign frequency bands (or channels) within the radio spectrum for specific uses, and in most cases, license the rights to these channels. If the spectrum is not being used by licensed services in a specific location at a specific time, unlicensed radio transmitters are allowed to operate in such spectrum at such locations. This part of the spectrum is often termed "white-space".

As a result of the digital switchover currently taking place around the world, bandwidth formerly used for broadcasting analogue television signals is being made available for other use. This is possible because digital transmissions can be compressed into fewer channels than analogue transmissions. In the United States, these abandoned television frequencies are primarily in the upper UHF (700 MHz) band, covering channels 52 to 69 (609-806 MHz). The use of white-space in other countries/regions will depend on the local regulatory authorities.

Various proposals have advocated using white spaces left by the digital switchover to provide wireless broadband internet access. As TV frequencies propagate over long distances and penetrate through obstacles, this part of the spectrum is considered to be ideal for such use.

On the 4 Nov. 2008, the Federal Communications Commission (FCC) approved the unlicensed use of white space in the United States provided certain rules are strictly abided by in order to avoid the potential interference issues. Firstly, white-space devices will have to include geographical location technology to match the current device location against a pre-existing database of spectrum users. All unlicensed white-space devices must therefore access the database to determine permitted channels before operating, and fixed devices must register information concerning the location of their operations in the database. Used together, the geographical location and database access features should allow fixed and portable white space devices to detect whether they are in danger of interfering with other signals and redirect their transmissions accordingly, possibly ceasing operation where necessary. Finally, the FCC also requires new unlicensed white-space devices to include spectrum-sensing technology allowing them to detect the presence of other signals in their vicinity.

On start-up, white-space devices will query the database with their current location (likely gleaned from GPS or mobile telephone triangulation) and will receive in response a list of frequencies that can (and/or cannot) be used within their local area. The geo-specific spectrum usage data received from the database may then be stored on the memory of the device. For portable white-space devices, the stored spectrum usage data must be updated to coincide with the changing location of the device. The best approach for updating the device with spectrum usage data is therefore an issue. Important considerations include the frequency of updates as well as the apparatus and method required to perform these updates.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided a processor for a device, the processor configured to:
  determine a current geographical area for the current device location within which geo-specific spectrum usage data are known;
  determine a geographical margin for the current geographical area, the geographical margin defining an outer area of the geographical area; and
  obtain geo-specific spectrum usage data corresponding to an adjacent geographical area from a location remote to the device when the device location is within the geographical margin.

The geo-specific spectrum usage data may contain power data. The power data may provide information on the transmitted signal power of some or all of the signals transmitted within the spectrum.

It should be appreciated that any reference to a geographical area may also include the space above or below this area. Therefore, the terms "area" and "margin" are not necessarily limited to a 2-dimensional space, but can comprise a 3-dimensional space.

The size of the geographical margin may be determined using the velocity of the device and a time parameter, the time parameter being greater than the time required to obtain the geo-specific spectrum usage data from the remote location.

The velocity of the device may be calculated using the geographical co-ordinates of the device at two points to determine the distance between these points, and dividing this distance by the time taken by the device to move between the two points. The velocity may be determined several times within a geographical area using different points.

Advantageously, the size of the adjacent geographical area, to which the obtained geo-specific spectrum usage data corresponds, is related to the size of the geographical margin. In one embodiment, the size of the adjacent geographical area to which the obtained geo-specific spectrum usage data corresponds may be fixed.

In one embodiment, the outer area defined by the geographical margin is located in front of the device relative to a direction in which the device is moving.

According to a further aspect, there is provided an apparatus comprising any processor described herein, the apparatus further comprising a storage medium for storing the geo-specific spectrum usage data. The geo-specific spectrum usage data may be stored on a temporary storage medium, which may comprise a volatile random access memory. The geo-specific spectrum usage data may be stored on a permanent storage medium, wherein the permanent storage medium is any of the following: a hard disk drive, a flash memory, and a non-volatile random access memory.

The apparatus may further comprise a location determinator for determining the current device location. The location determinator may be any of the following: a Global Positioning System (GPS), triangulation equipment, and a Wi-Fi positioning system.

Advantageously, the apparatus further comprises a transceiver configured to exchange data between the device and a location remote to the device. Data may be exchanged between the device and a location remote to the device using wireless Internet technology, wherein the wireless technology is any of the following: a Wi-Fi network, a mobile telephone network, a satellite internet service, and a Worldwide Interoperability for Microwave Access (WiMax) network.

The device may be a white-space device. The device may be a portable telecommunications device.

The processor may be a microprocessor, including an Application Specific Integrated Circuit (ASIC).

According to a further aspect, there is provided a method for operating a device, the method comprising:
  determining a current geographical area for the current device location within which geo-specific spectrum usage data are known;
  determining a geographical margin for the current geographical area, the geographical margin defining an outer area of the geographical area; and
  obtaining geo-specific spectrum usage data corresponding to an adjacent geographical area from a location remote to the device when the device location is within the geographical margin.

There may be provided a computer program, recorded on a carrier, the computer program comprising computer code configured to operate a device by:
  determining a current geographical area for the current device location within which geo-specific spectrum usage data are known;
  determining a geographical margin for the current geographical area, the geographical margin defining an outer area of the geographical area; and
  obtaining geo-specific spectrum usage data corresponding to an adjacent geographical area from a location remote to the device when the device location is within the geographical margin.

According to a further aspect, there is provided a database server, the database server configured to:
  receive location data from a device remote to the database server, the location data comprising the current geographical location of the device;
  determine a current geographical area for the current device location within which geo-specific spectrum usage data are known by the device;
  determine a geographical margin for the current geographical area, the geographical margin defining an outer area of the geographical area; and
  transmit to the device geo-specific spectrum usage data corresponding to an adjacent geographical area when the device location is within the geographical margin.

There is also provided a system comprising a database server and a device remote from the database server, wherein the device is configured to:
  determine a current geographical area for the current device location within which geo-specific spectrum usage data are known by the device;
  determine a geographical margin for the current geographical area, the geographical margin defining an outer area of the geographical area; and
  obtain from the database server geo-specific spectrum usage data corresponding to an adjacent geographical area when the device location is within the geographical margin.

There is also provided a system comprising a database server and a device remote from the database server, wherein the database server is configured to:
  receive location data from the device, the location data comprising the current geographical location of the device;
  determine a current geographical area for the current device location within which geo-specific spectrum usage data are known by the device;
  determine a geographical margin for the current geographical area, the geographical margin defining an outer area of the geographical area; and
  transmit to the device geo-specific spectrum usage data corresponding to an adjacent geographical area when the device location is within the geographical margin.

There is also provided a processor for a device, the processor configured to:
  determine a current geographical area for the current device location within which geo-specific spectrum usage data are known;
  determine the direction of movement of the device with respect to an adjacent geographical area; and
  based on the direction of movement, retrieve geo-specific spectrum usage data corresponding to the adjacent geographical area from a location remote to the device.

Advantageously, the current geographical area is divided into an array of cells separated by cell boundaries. The direction of movement of the device may be based on the device crossing a particular cell boundary.

The known geo-specific spectrum usage data may be replaced by the retrieved geo-specific spectrum usage data such that the size of the current geographical area before and after retrieval of the geo-specific spectrum usage data is the same.

There is also provided a processor for a device, the processor configured to:
  determine a geographical margin for the current geographical area based on the direction of movement of the device, the geographical margin defining an outer area of the geographical area; and
  obtain geo-specific spectrum usage data corresponding to an adjacent geographical area from a location remote to the device when the device location is within the geographical margin.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 6b illustrates schematically another method for operating a device;

DESCRIPTION OF SPECIFIC ASPECTS/EMBODIMENTS

Figure 1A:
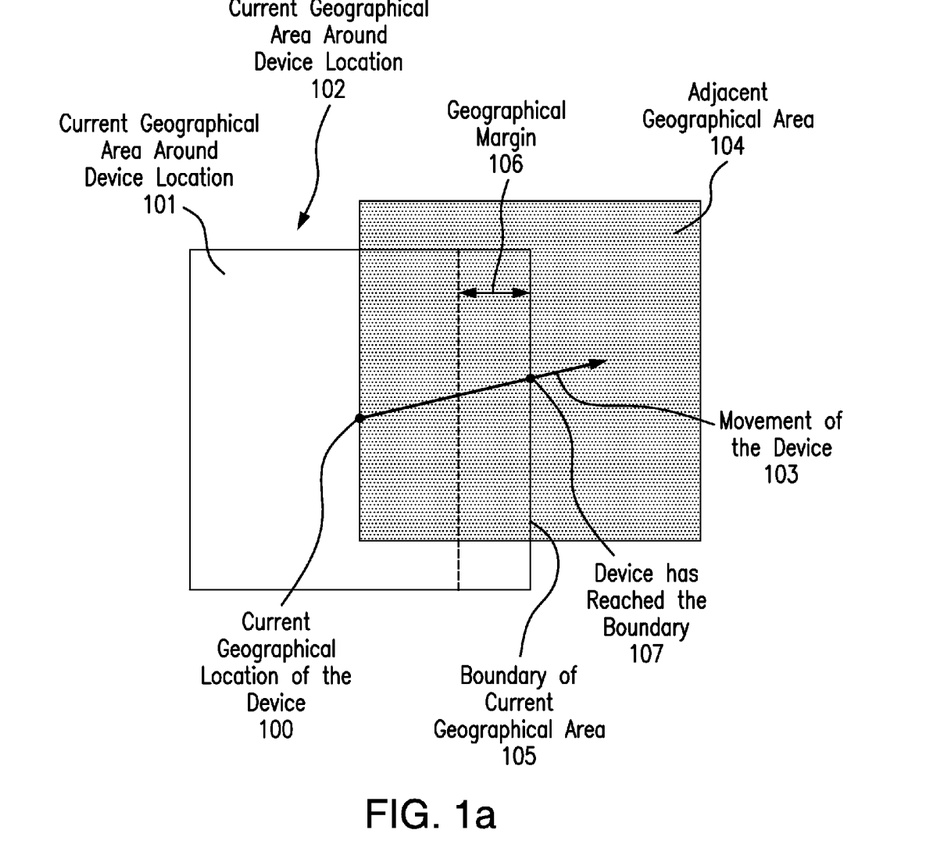
FIG. 1a illustrates schematically a method of updating a device with relevant geo-specific data.

Referring to FIG. 1a, there is illustrated a method for updating a moving white-space device with geo-specific spectrum usage data. When the device is switched on, the first thing it must do is determine its current geographical location 100. In practise, this could be achieved using a location determinator, which may include a Global Positioning System (GPS), triangulation equipment or a Wi-Fi positioning system. Once armed with this location data, the device must then obtain spectrum usage data corresponding to its current location 100 from a remote database. To achieve this, the device will query the database with its current location, receiving in response a list of frequencies available for use within a given area. The response may be a list of frequencies that are not to be used within a given area, depending on the implementation of the database. This area, referred to herein as the "current geographical area" 101, is a geographical area around the current device location within which spectrum usage data are known by the device. This geographical area may define the range of a cellular or WLAN network, or even a sub-region within that range. It should be appreciated that any reference to an area may also include the space above or below this area. Therefore, the term "area" is not necessarily limited to a 2-dimensional space, but can comprise a 3-dimensional space. Furthermore, the word "known" in this context refers to information that the device has received or is currently stored on the device. Likewise, the word "unknown" refers to information that the device has not yet received or is not currently stored on the device.

The current geographical area 101 is defined in FIG. 1a by an unfilled square box 102 around the device location 100, but in practice may take a different shape, perhaps even an irregular shape. By obtaining this spectrum usage data, the device discovers which frequencies are available for use within the current geographical area 101 and which frequencies are not to be used. Outside of the current geographical area 101, however, the spectrum usage is unknown to the device. The size of the current geographical area 101 may be fixed, but could be dictated by the amount of storage space on the device available for storing geo-specific spectrum usage data. Information may be stored on a temporary storage medium such as a volatile random access memory, or on a permanent storage medium such as a hard disk drive, a flash memory, or a non-volatile random access memory. For example, the device may possess sufficient memory to hold only the spectrum usage data covering an area of 10 km×10 km. The size of the local geographical area 101 could be dictated by a maximum download limit which restricts the amount of data that can be received from the remote database within a single update or within a given amount of time.

Movement of the device is depicted in FIG. 1a by a solid arrow 103 and may be determined using the location determinator. If the device moves out of the current geographical area 101 and into a neighbouring area, herein referred to as the "adjacent geographical area" 104, it must obtain geo-specific spectrum usage data corresponding to the adjacent geographical area 104. One aspect is concerned with when the device updates the spectrum usage data it currently holds. According to the FCC rules, devices must access a TV bands database to determine the TV channels that are available at their location prior to their initial transmission at a given location. The device may access the database via an open connection point. It would be beneficial if the device obtained the spectrum usage data for the adjacent geographical area 104 before entering the adjacent geographical area 104. Obtaining the spectrum usage data from the remote database will take time, however. The device must set up a connection with a database server (or access point) and transmit location data to the server before it can receive the relevant data from the database. Therefore, a time delay of a few seconds is not unrealistic. Data may be exchanged between the device and the server using wireless internet technology, which could be any of the following: a Wi-Fi network, a mobile telephone network, a satellite internet service, and a Worldwide Interoperability for Microwave Access (WiMax) network. It would be advantageous for the device to begin updating the spectrum usage data before it reaches the boundary 105 of the current geographical area 101.

In FIG. 1a, the device moves from its original location 100 towards the boundary 105 of the current geographical area 101. According to one aspect, the device begins updating its spectrum usage data when it reaches a geographical margin 106 within the boundary 105 of the current geographical area 101. The geographical margin 106 is the distance from the boundary 105 at which the device must begin updating its spectrum usage data in order to have completed the update by the time the device reaches the boundary 105. In certain embodiments, the geographical margin may only be calculated for a section (or sections) of the boundary in front of the device (i.e. for the direction in which the device is moving and not for the opposite direction). This may be appropriate, for example, where the current geographical area is square in shape, as illustrated in FIG. 1*a* (or other regular shapes). In this situation, it may be sufficient to calculate the margin for one side of the square boundary rather than for all sides, since it is the boundary between the current and adjacent geographical areas that is most relevant.

In another embodiment, the geographical margin may be calculated for the section of the boundary in front of the device, but then applied to all sections of the boundary. Referring to FIG. 1*a*, this means that even though the margin is calculated with respect to boundary section 105, the margin would be applied to all four sides of the geographical area defined by the unfilled square 102. This approach might be beneficial where the current geographical area has an irregular shape (such as the current geographical area illustrated in FIG. 2).

Figure 1B:
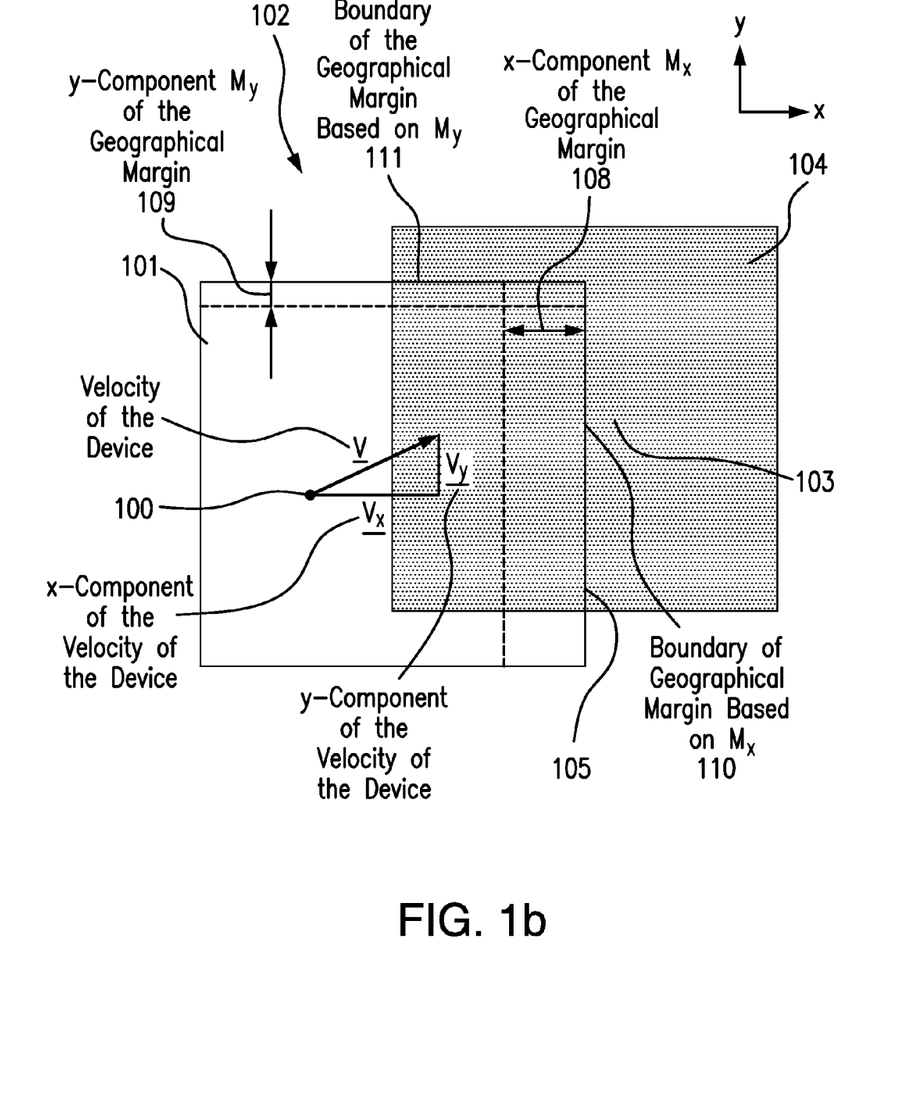
FIG. 1b illustrates schematically another method of updating a device with relevant geo-specific data.
Figure 1C:
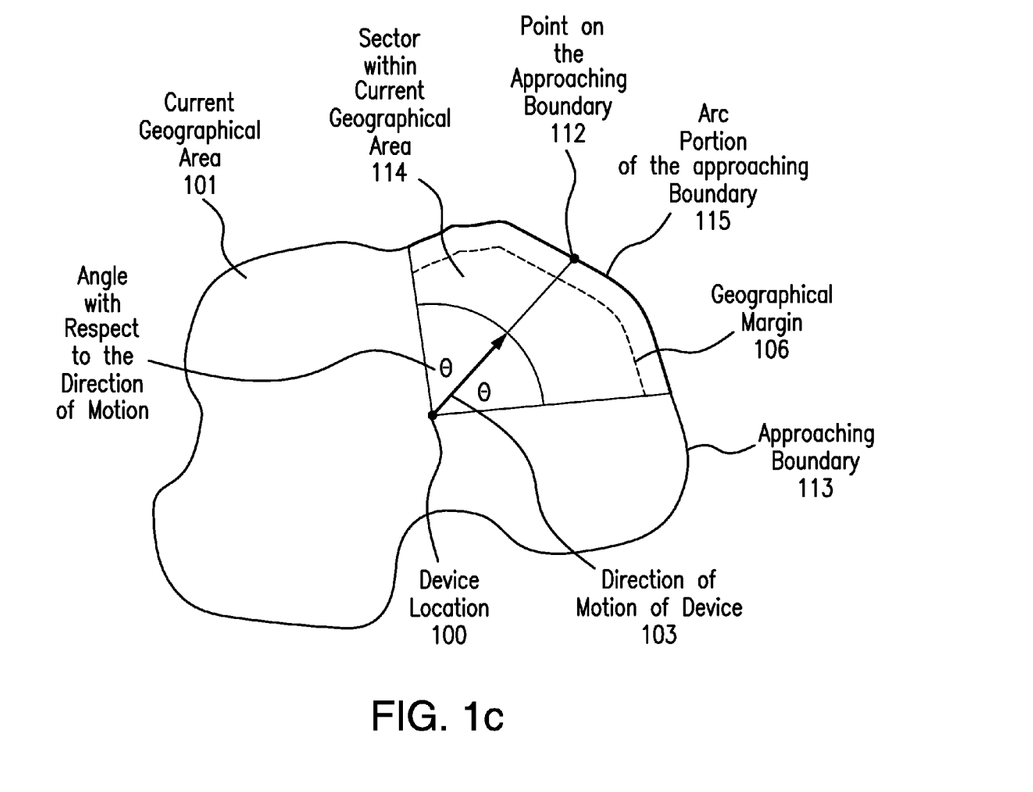
FIG. 1c illustrates schematically another method of updating a device with relevant geo-specific data.

In another embodiment (FIG. 1*c*), the geographical margin 106 may be calculated with respect to a point 112 on the approaching boundary 113, and then applied to a portion 115 of the approaching boundary 113, the length of which may be less than the length of the complete boundary 113. The length of the portion 115 may be fixed, but could vary. The length of the portion 115 may be determined by an angle θ with respect to the direction of motion 103 of the device. This is illustrated in FIG. 1*c*. In this figure, the direction of motion 103 of the device is indicated by the velocity vector. By projecting an angle 2θ onto the approaching boundary 113 from the device location 100, we define a sector 114 within the current geographical area 101, and an arc (i.e. the portion 115) on the approaching boundary 113. The length of the arc varies with the projected angle 2θ. The angle 2θ may range from 0° to 90° (i.e. an angle θ of 45° on either side of the direction of motion 103 of the device). The angle 2θ may be proportional to the speed of the device. When the device is moving quickly, a margin 106 covering a large portion of the boundary 113 may be favourable to take into account changes in the device direction. This embodiment might be particularly beneficial where the current geographical area 101 has an irregular or curved shape and it would otherwise be difficult to distinguish between the different boundary sections 105 (in contrast to the square boundary 102 shown in FIG. 1*a*). This embodiment therefore allows the geographical margin 106 to be calculated and applied to a portion of the boundary which is most relevant with respect to the direction of motion 103 of the device (rather than applying the same margin to the complete boundary), regardless of the shape of the current geographical area 101.

The geographical margin 106 is calculated by multiplying the velocity of the device by a time parameter (as shown in Equation 1, below, where $\overline{M}$ is the geographical margin, $\overline{v}$ is the velocity of the device, and t is the time parameter), the time parameter being larger than the time required to complete the update.

$$\overline{M} = \overline{v}t \quad \text{(Equation 1)}$$

Throughout the specification, the term "velocity" may be used interchangeably with "speed". That is to say, in some embodiments, the speed and specific direction of the device are important to the apparatus/device and method described herein. In other embodiments, however, the specific direction of the device is less important.

The geographical margin may therefore be represented as a scalar or as a vector. In the embodiment described above, the margin may best be described as a scalar since it is the distance from the boundary in front of the device (whichever direction that may be). In this situation the axial components of the velocity are not considered separately, and only the magnitude of the velocity (i.e. the speed of the device) is relevant. With respect to this embodiment, Equation 1 may be better expressed without the vector notation:

$$M = vt \quad \text{(Equation 2)}$$

In another embodiment (FIG. 1*b*), the axial components of velocity are taken into account. If the velocity of the device is separated into its axial components (2D in this example but may be 3D), $(v_x, v_y)$, the geographical margin may be represented as $(M_x, M_y)$ and the x and y components of the margin can be calculated separately (Equation 3).

$$(M_x, M_y) = (v_x, v_y)t \quad \text{(Equation 3)}$$

Using this approach, $M_x$ 108 and $M_y$ 109 may be applied to those boundary sections that lie along the x and y axes, respectively. With reference to FIG. 1*b*, $M_x$ 108 (calculated using $v_x$) is applied to boundary section 110 and margin $M_y$ 109 (calculated using $v_y$) is applied to boundary section 111. Therefore, the device will begin to update the spectrum usage data when it reaches either of $M_x$ 108 or $M_y$ 109.

If the time parameter is not larger than the time required to complete the update, the device will not be able to update before it reaches the adjacent geographical area 104 unless its velocity remains equal to or less than its velocity at the time of calculation. For example, if the velocity of the device increases, so too will the required geographical margin, which may then be greater than the distance of the device from the boundary 105. By making the time parameter greater than the time required to complete the update, the present embodiment takes into account reasonable velocity increases. In order to completely overcome this issue, however, the device may include a fail-safe feature which prevents it from transmitting in the adjacent geographical area 104 until the spectrum usage update has been completed.

To avoid the above-mentioned situation, an adaptive algorithm may be used to predict the future device velocity based on previous behaviour, thereby taking into account any likely speed increases. For example, if the device was moving towards a boundary at a velocity, v1, and the adaptive algorithm predicted that the device velocity would increase to a higher velocity, v2, closer to the boundary, the geographical margin could be determined using velocity, v2, and a time parameter (which may be greater than the time required to complete the update). Provided the speed increases were correctly predicted, there would be no need for an additional fail-safe feature. The adaptive algorithm may also be used to predict changes in the device direction. This may help to ensure that the geographical margin is determined for the correct boundary.

Another fail-safe feature may be to calculate the geographical margin using the maximum velocity at which the device can travel rather than the current velocity of the device. This embodiment therefore fixes the size of the geographical margin, but guarantees that the update will be completed before the device enters the adjacent geographical area. Using this approach, the device accesses the database for the relevant spectrum usage data once it gets to within this fixed margin, regardless of how fast the device is travelling. Also, in this embodiment, the time parameter need not be greater than the time required to obtain the spectrum usage data from the database. Instead, a time parameter equal to the time required to obtain the spectrum usage data from the database would suffice.

Another point to note is that the geographical margin will be zero when the device is stationary. In this situation, the spectrum usage data held on the device may need to be updated at regular time intervals to take into account any spectrum usage changes within the current geographical area, instead of updating when the device reaches the geographical margin.

In another embodiment, a default margin (which is not dependent on the current device velocity) may be applied to all sections of the current geographical area boundary when the device is stationary.

In FIG. 1a, the adjacent geographical area 104, which is the area corresponding to the spectrum usage data known by the device after the update has been completed, is shown as a filled square box around the device location (here we assume that the device has reached the boundary 105 of the current geographical area 101, denoted by point 107), but in practice could take a different shape, perhaps even an irregular shape. The size of the adjacent geographical area 104 may be fixed, but could be dictated by the amount of storage space on the device available for storing geo-specific spectrum usage data. The size of the adjacent geographical area 104, however, may be dictated by a maximum download limit which restricts the amount of data that can be received from the remote database within a single update or within a given amount of time.

The size of the adjacent geographical area may be dictated by the coverage of the signal transmitted by the device. In this way, it is possible to ensure that the signal transmitted by the device does not interfere with any other signal transmitted in that area. There would be no need to have spectrum usage data corresponding to areas outside of this coverage zone because the signal transmitted by the device would not be capable of interfering with any other signal transmitted outside of the coverage zone.

The size of the adjacent geographical area 104 may be related to the size of the geographical margin 105 (but not necessarily the same size as the geographical margin), thereby linking the size of the adjacent geographical area 104 to the velocity of the device. This feature would provide a fast moving device with spectrum usage data corresponding to a larger area than the spectrum usage data required by a slower moving device. This is advantageous because it would reduce the frequency of required updates for faster moving devices.

Furthermore, the adjacent geographical area 104 is shown as overlapping the current geographical area 101 in FIG. 1a, implying that the spectrum usage data stored on the device after the update has been completed comprises some of the original spectrum usage data and some new spectrum usage data. This aspect is advantageous because less data needs to be downloaded from the database which in turn reduces the connection time and battery usage. Whilst this represents one possibility, the spectrum usage data stored on the device after the update may comprise only new spectrum usage data without any of the previous spectrum usage data.

Figure 2:
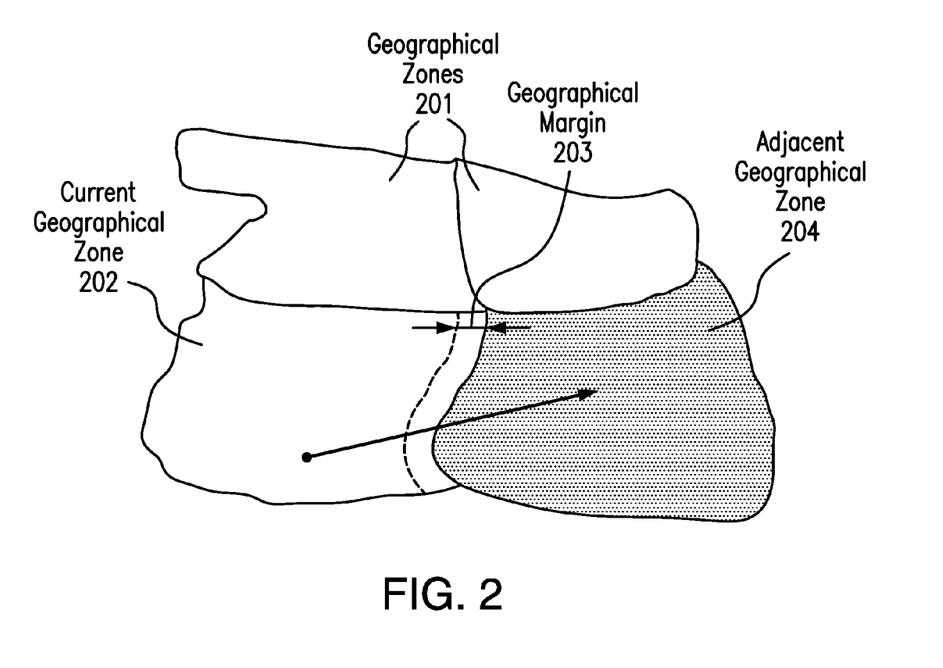
FIG. 2 illustrates schematically another method of updating a device with relevant geo-specific data.

In FIG. 2a, there is illustrated schematically another method of updating a device with geo-specific spectrum usage data, wherein the spectrum usage data stored in the remote database is arranged into different geographical zones 201. The geographical zones 201 may or may not be equal in size or shape. In this figure the geographical zones 201 are irregular in shape but in practice need not be. When the device is switched on, it starts by determining its current geographical location as before. Following this, the device queries the remote database with its location data to obtain the relevant spectrum usage data, and receives spectrum usage data corresponding to the current geographical zone 202 within which the device location falls.

As the device moves, a geographical margin 203 is calculated (as outlined with respect to FIG. 1) to determine when the device needs to update the stored spectrum usage data. Again, the update begins when the device enters the geographical margin 203. In this embodiment, the spectrum usage data received from the database corresponds to the adjacent geographical zone. As a result, there is no overlap between the current 202 and adjacent 204 geographical zones, and the spectrum usage data stored on the device after the update has been completed comprises only new spectrum usage data without any of the previous spectrum usage data.

According to another embodiment, the spectrum usage data may be updated without the need for the geographical margin 106. In this embodiment, the database is queried with location data received from the location determinator when the device is switched on. Spectrum usage data is then retrieved from the database corresponding to an area (the current geographical area 101) around the current device location 100. When the device moves, the direction of movement 103 of the device is determined. This may be performed using the location determinator, which may be one of the following: a Global Positioning System (GPS), triangulation equipment or a Wi-Fi positioning system. Following this, spectrum usage data corresponding to the adjacent geographical area 104 is retrieved from the database. The device may access the database for spectrum usage data whenever the direction 103 of the device changes. The device therefore retrieves spectrum usage data corresponding to the approaching adjacent geographical area 104. A fail safe mechanism may be employed when the direction of travel 103 remains constant for a prolonged period of time. For example, if the device remains travelling in the same direction 103 for a specified time, the device may be forced to access the database for spectrum usage data.

Figures 3A, 3B:
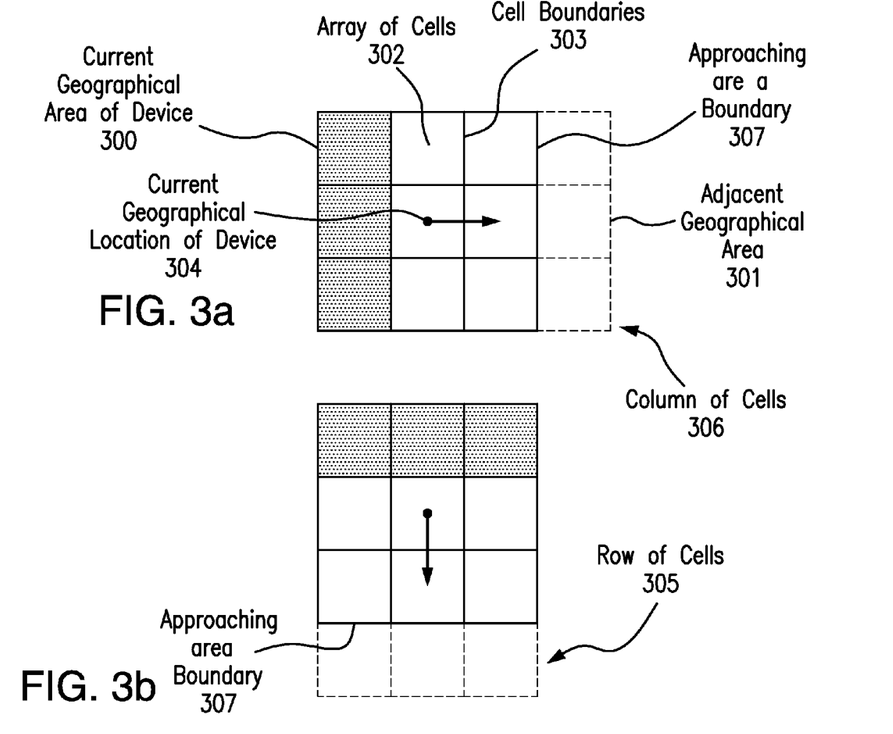
FIG. 3a illustrates schematically a method of updating a device with relevant geo-specific data without using a geographical margin when the device is moving in the positive x direction.
FIG. 3b illustrates schematically another method of updating a device with relevant geo-specific data without using a geographical margin when the device is moving in the negative y direction.
Figure 3C:
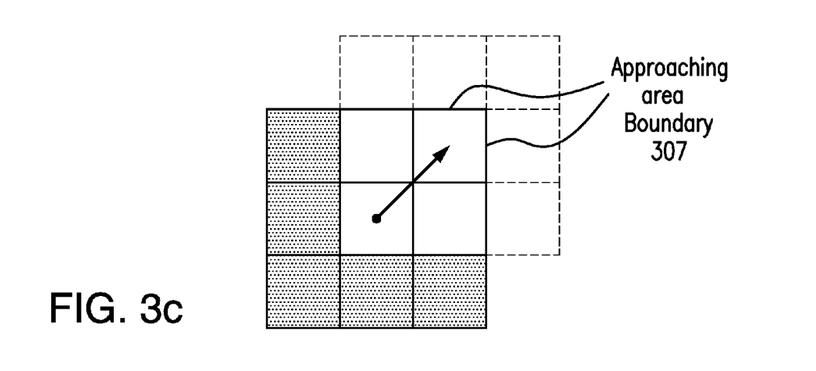
FIG. 3c illustrates schematically another method of updating a device with relevant geo-specific data without using a geographical margin when the device is moving diagonally in the xy plane.

In FIG. 3, there is illustrated schematically another method of updating a device with geo-specific spectrum usage data. In this embodiment, the current 300 and adjacent 301 geographical areas are divided into an array of cells 302 separated by cell boundaries 303. The distance between adjacent cell boundaries 303 may be determined by multiplying the device velocity by a time parameter. The cells may be identical in size and shape, but need not be. Advantageously, the device velocity used for the calculation is the maximum velocity at which the device can travel. The time parameter may be greater than or equal to the time required to obtain the spectrum usage data from the database. Advantageously, the current 300 and adjacent 301 geographical areas are divided into a whole number of cells 302 with no gaps between the cells. The current geographical area 300, the adjacent geographical area 301 and the cells 302 may be square or rectangular in shape (cubes or cuboids in 3D), but they could take other forms.

When the device is switched on, it starts by determining its current geographical location 304 as before. Following this, the device queries the remote database with its location data to obtain the relevant spectrum usage data, and receives spectrum usage data corresponding to the current geographical area 300. At this stage the device may be centred in the current geographical area 300, but could be located elsewhere within the current geographical area. When the device moves, the direction of motion is determined. The direction of motion may be determined by crossing a particular cell boundary. When the device crosses a cell boundary 303 (or possibly a pair of cell boundaries 303 if moving diagonally), it accesses the database to update the spectrum usage data. The data obtained from the database during each update may correspond to a single row 305 or column 306 of cells 302 in the adjacent geographical area 301 (as shown in FIGS. 3a and 3b). More specifically, the data obtained during each update may correspond to the row 305 (FIG. 3b) or column 306 (FIG. 3a) closest to the approaching area boundary 307. When the device moves diagonally (FIG. 3c), the data obtained during the update may correspond to part of the row 305 and part of the column 306 closest to the approaching area boundary 307. The device may access the database for new spectrum usage data every time it crosses a cell boundary 303.

As mentioned previously, due to data storage limitations, the size of the current geographical area may be restricted. In this embodiment, however, each time new spectrum usage data (which may correspond to a row, column, or part of a row and part of a column) is added to the memory, data from the opposite side of the current geographical area (which may correspond to a row, column, or part of a row and part of a column) is removed (i.e. the data is effectively overwritten) such that the size and shape of the current geographical area remains the same. Consequently, the device may remain in the central region of the current geographical area at all times and may be surrounded by cells within which spectrum usage data are known.

Using the maximum velocity at which the device can travel and the time taken to update the spectrum usage data to determine the cell size ensures that each update is completed by the time the device has reached the subsequent cell boundary, regardless of the current device velocity.

Figure 4:
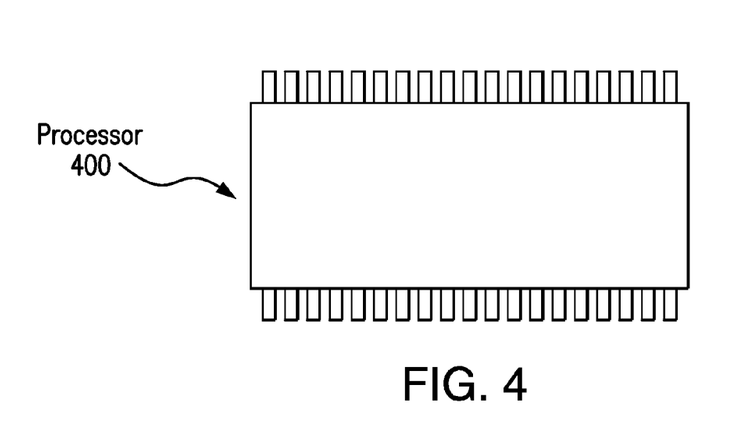
FIG. 4 illustrates schematically a processor for a device.

The apparatus required to perform the spectrum usage updates is shown in FIGS. 4, 5, 8 and 9. In FIG. 4 there is illustrated a processor 400 for the device, which may be a microprocessor. The processor 400 is configured to query the remote database (when the device is first switched on) with location data received from the location determinator to obtain spectrum usage corresponding to the current geographical area 101. On receipt of spectrum usage data, the processor 400 determines the current geographical area 101 around the current device location within which spectrum usage data are known by the device, thereby establishing where the boundaries 105 lie in relation to the current location of the device. Following this, the processor 400 calculates the geographical margin 106 using the velocity of the device and the time parameter, and once the device is within the geographical margin 106, queries the remote database once again, this time to obtain spectrum usage data corresponding to the adjacent geographical area 104. The processor 400 is required to repeat the process of determining the geographical boundaries 105 and calculating the geographical margin 106 whenever the device receives spectrum usage data from the remote database. The processor 400 is also required to access the remote database whenever the device reaches the geographical margin. In addition, the processor 400 may be required to calculate the geographical margin 106 several times within a particular geographical area to account for changes in the velocity of the device.

In the embodiment illustrated in FIG. 3, the geographical margin is not required. Instead, the current 300 and adjacent 301 geographical areas are divided into an array of cells 302 separated by cell boundaries 303. The cells may be identical in size or shape, but need not be. In this embodiment, the processor 400 is configured to query the remote database (when the device is first switched on) with location data received from the location determinator to obtain spectrum usage data corresponding to the current geographical area 300. On receipt of spectrum usage data, the processor 400 determines the current geographical area 300 around the current device location within which spectrum usage data are known by the device. Following this, the processor 400 determines the size of the cells 302. The size of the cells 302 may be determined using the velocity of the device (which may be the maximum velocity at which the device can travel) and a time parameter, the time parameter being greater than or equal to the time required to obtain spectrum usage data from the database. This step establishes where the cell boundaries 303 lie in relation to the current location of the device. When the device crosses a cell boundary 303, the processor 400 queries the remote database to obtain spectrum usage data corresponding to the adjacent geographical area 301. In this embodiment, the adjacent geographical area 301 is also divided into an array of cells 302 (which may or may not be identical to those in the current geographical area 300) separated by cell boundaries 303, and the spectrum usage data received from the database corresponds to cells 302 within the adjacent geographical area 301 (as illustrated in FIG. 3). The processor 400 is required to determine the current geographical area 300 and establish the location of the cell boundaries 303 after each update, and access the remote database whenever the device crosses a cell boundary 303.

Figure 5:
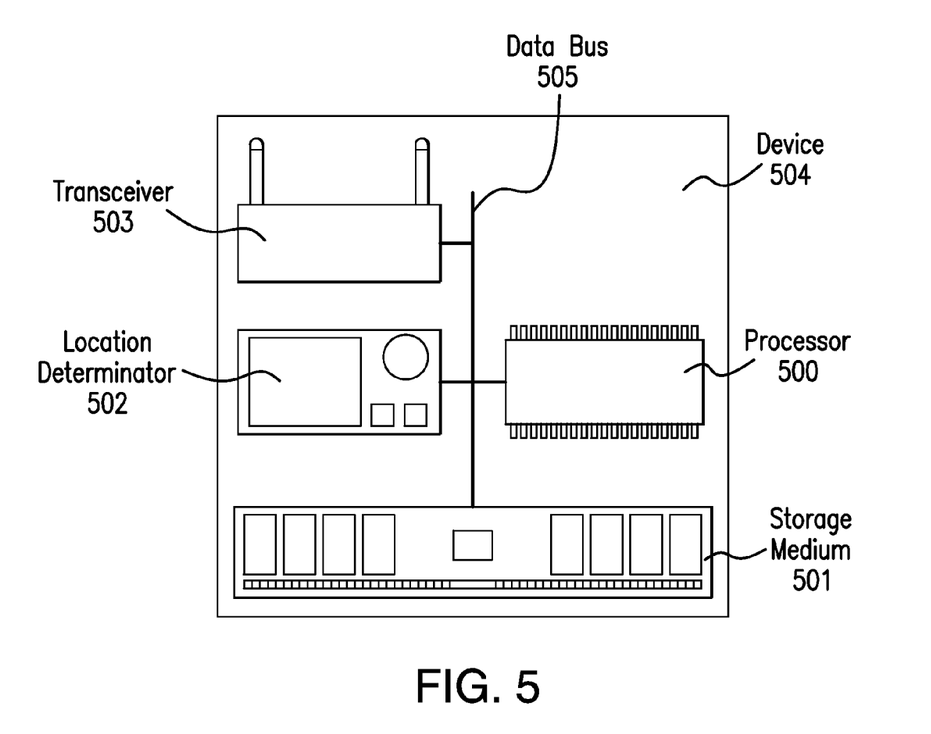
FIG. 5 illustrates schematically an apparatus comprising a processor.

In FIG. 5 there is illustrated an apparatus comprising a processor 500, a storage medium 501, a location determinator 502 and a transceiver 503 for a device 504 which may be electrically connected to one another by a data bus 505. The processor is as described with reference to FIG. 4. The storage medium 501 is required for storing spectrum usage data received from the remote database, and may be a temporary storage medium comprising a volatile random access memory. The storage medium 501 may be a permanent storage medium comprising a hard disk drive, a flash memory or a non-volatile random access memory.

The location determinator 502 is required to determine the current geographical location of the device. The location of the device will be determined when the device is switched on, but also at regular intervals thereafter to monitor the location of the device relative to the boundaries 105 of the geographical area. The location determinator 502 may be any of the following: a Global Positioning System (GPS), triangulation equipment, and a Wi-Fi positioning system.

The transceiver 503 is configured to exchange data between the device 504 and the database server which hosts the remote database. Data may be exchanged between the device 504 and the database server using wireless internet technology, wherein the wireless technology is any of the following: a Wi-Fi network, a mobile telephone network, a satellite internet service, and a Worldwide Interoperability for Microwave Access (WiMax) network.

Figure 6A:
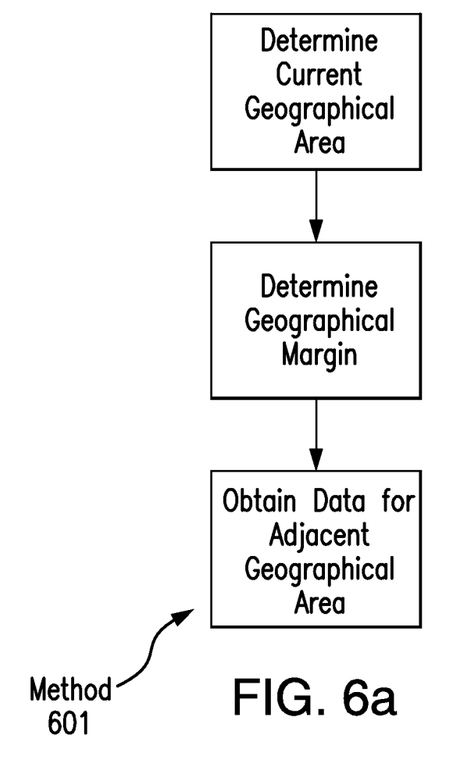
FIG. 6a illustrates schematically a method for operating a device.

In FIG. 6a there is illustrated a method 601 for updating a device 504 with geo-specific spectrum usage data. The first step comprises determining the current geographical area 101 around the current device location within which geo-specific spectrum usage data are known, and hence establishing the boundaries of the current geographical area. In order to achieve this, the current location of the device must be known and the device 504 must possess spectrum usage data corresponding to the current geographical area 101. Following this, the geographical margin 106 is determined using the velocity of the device and a time parameter. Once the geographical margin 106 has been determined and the device 504 has entered the margin 106, spectrum usage data corresponding to the adjacent geographical area 104 is obtained from the remote database. This method 601 needs to be repeated whenever the device enters a new geographical area. In addition, the geographical margin 106 may need to be determined several times within a particular geographical area to account for changes in the velocity of the device.

In FIG. 6b there is illustrated another method for updating a device with geo-specific spectrum usage data without using a geographical margin. The first step comprises determining the current geographical area 300 around the current device location within which geo-specific spectrum usage data are known, and hence establishing the boundaries 307 of the current geographical area 300. In order to achieve this, the current location of the device must be known and the device must possess spectrum usage data corresponding to the current geographical area 300. In this embodiment the current geographical area 300 is divided into an array of cells 302. The cells may be identical in size or shape but need not be. The next step, therefore, is to determine the size of each cell 302. The size of each cell may be determined using the velocity of the device (which may be the maximum velocity at which the device can travel) and a time parameter, the time parameter being greater than or equal to the time required to update the spectrum usage data. This step establishes the location of the cell boundaries 303 with respect to the current device location. Once the cell boundaries 303 have been established, spectrum usage data corresponding to the adjacent geographical area 301 is obtained from the remote database when the device crosses a cell boundary 303. The direction of movement of the device may be determined by the particular cell boundary crossed by the device. After obtaining the spectrum usage data, the current geographical area 300 and cell boundaries 303 must then be re-established. This method needs to be repeated whenever the device crosses a cell boundary 303.

Figure 7:
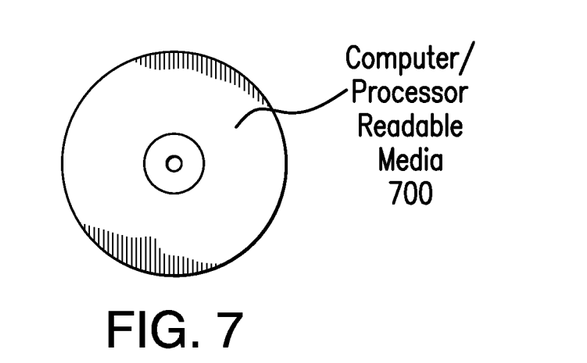
FIG. 7 illustrates schematically a computer readable media providing a program.

FIG. 7 illustrates schematically a computer/processor readable media 700 providing a program according to one embodiment. In this example, the computer/processor readable media is a disc such as a digital versatile disc (DVD) or a compact disc (CD). In other embodiments, the computer readable media may be any media that has been programmed in such a way as to carry out an inventive function.

Other embodiments depicted in the figures have been provided with reference numerals that correspond to similar features of earlier described embodiments. For example, feature number 1 may also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

Figure 8:
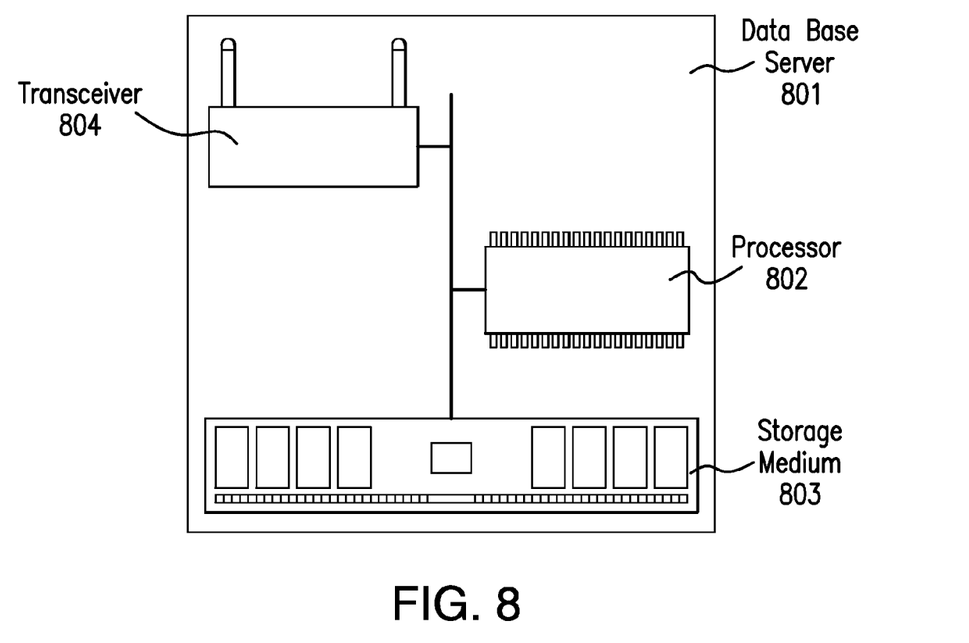
FIG. 8 illustrates schematically a database server.

In FIG. 8 there is illustrated schematically a database server 801. The database server 801 is situated at a location remote to the device 504 and hosts the spectrum usage database which the device 504 accesses to obtain the relevant spectrum usage data. The server comprises a processor 802, a storage medium 803 and a transceiver 804, and at the most basic level is configured to receive location data from the device 504 and send geo-specific spectrum usage data to the device 504.

The database server 801 may, however, perform tasks previously assigned to the device 504. For example, on receipt of location data sent by the device 404, the server may determine a geographical area around the current device location corresponding to spectrum usage data required by the device 504 (and hence establish the boundaries 105 of the geographical area) before sending the spectrum usage and geographical data to the device 504. The server might also determine the geographical margin 106 using the velocity of the device and a time parameter (previously received from the device) and send this information to the device. As mentioned previously, the time parameter is chosen to provide adequate time for the device to access the database and receive the required spectrum usage data before the device enters the adjacent geographical area. Since the time required for the device to connect to the server and receive the necessary data might vary (depending on data transfer rates or the volume of network traffic for example), the time parameter will vary in accordance with this. Therefore, the time parameter may be determined by the server and based upon the current data transfer rate or current volume of network traffic. The time parameter may be constantly monitored and updated by the server. The server may also determine the cell size (as described earlier with reference to FIG. 3) using the device velocity and the time parameter, and establish the location of the cell boundaries with respect to the current device location.

If the server performs the above-mentioned tasks, the device 504 will not have to. This embodiment therefore reduces the work of the device processor 500 and may help to minimise the cost of the device processor 500. In another embodiment, the tasks may be shared between the device and server.

Figure 9:
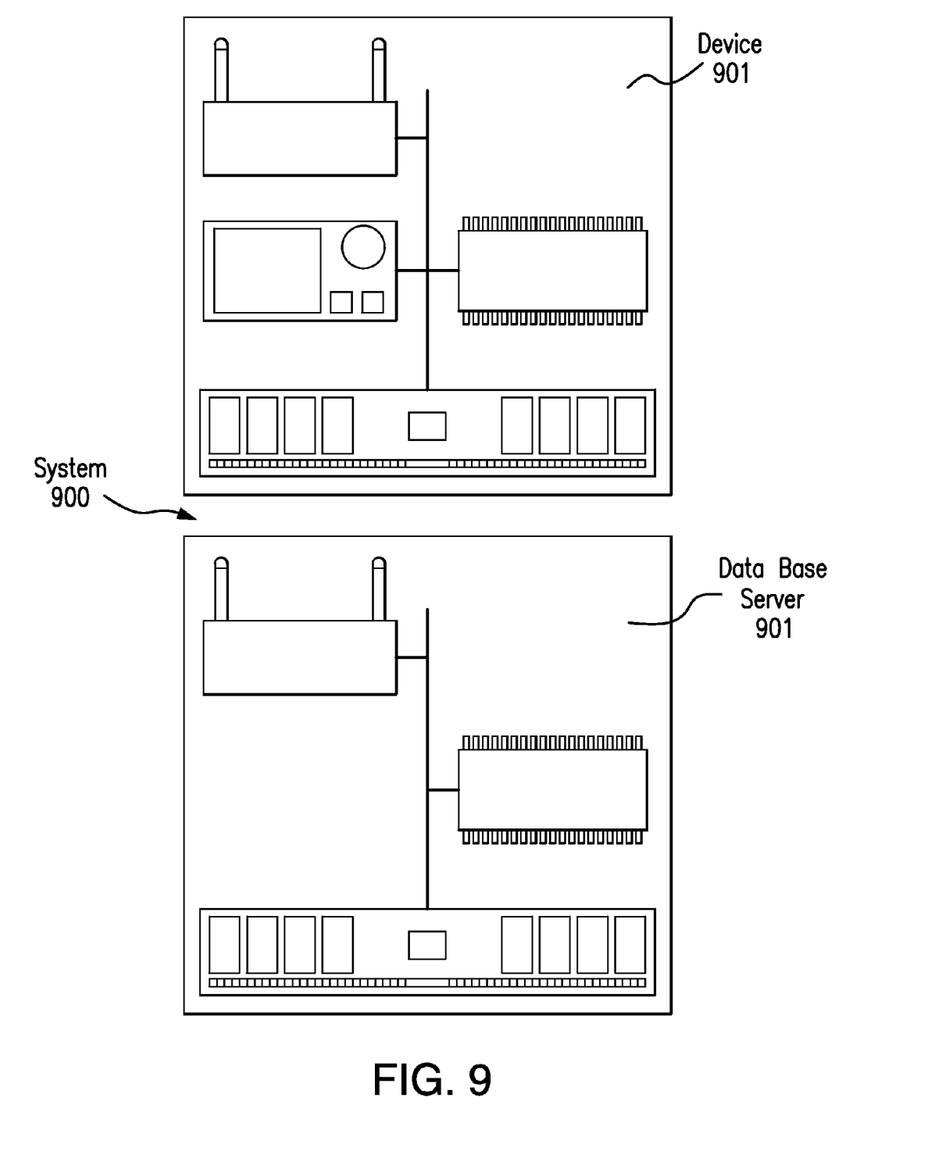
FIG. 9 illustrates schematically a system comprising a database server and a device.

In FIG. 9 there is illustrated schematically a system 900 comprising a device 901 and a database server 902. The device is as described with reference to FIG. 5 and the database server is as described with reference to FIG. 8. As mentioned above, the tasks of determining geographical areas, establishing the boundaries of these geographical areas, determining the geographical margins, or determining the cell size could be performed at either the device 901 or server 902 end, or could be shared between the device 901 and server 902.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, comprising:
   at least one processor;
   at least one memory including computer program code;
   the at least one memory and the computer program code configured to, with the at least one processor, cause the apparatus at least to:
   determine a current geo-location of the apparatus and obtain a geographical area and geo-specific spectrum usage data associated with the current apparatus location, via a signaling exchange with a database server remote from the apparatus;
   calculate a geographical margin for the current geographical area, the geographical margin defining an outer area of the geographical area, the calculation performed before the apparatus enters the geographical margin; and
   obtain geo-specific spectrum usage data corresponding to an adjacent geographical area via a signaling exchange with a database server remote to the apparatus, when the apparatus starts to enter the geographical margin.

2. The apparatus according to claim 1, wherein the size of the geographical margin is determined using the velocity of the apparatus and a time parameter, the time parameter being greater than the time required to obtain the geo-specific spectrum usage data from the remote database server.

3. The apparatus according to claim 1, wherein the size of the adjacent geographical area, to which the obtained geo-specific spectrum usage data corresponds, is related to the size of the geographical margin.

4. The apparatus according to any preceding claim 3, wherein the outer area defined by the geographical margin is located in front of the apparatus relative to a direction in which the apparatus is moving.

5. The apparatus according to claim 4, wherein the apparatus is one or more of a portable telecommunications device and a white-space device.

6. The apparatus according to claim 1, wherein the size of the adjacent geographical area, to which the obtained geo-specific spectrum usage data corresponds, is fixed.

7. The apparatus of claim 6, further comprising one or more of a storage medium for storing the geo-specific spectrum usage data, a location determinator for determining the current apparatus location, and a transceiver configured to exchange data between the apparatus and a location remote to the apparatus.

8. A method for operating an apparatus, the method comprising:
   (i) determine a current geo-location of the apparatus and obtain a geographical area and geo-specific spectrum usage data associated with the current apparatus location, via a signaling exchange with a database server remote from the apparatus;
   (ii) calculate a geographical margin for the current geographical area, the geographical margin defining an outer area of the geographical area, the calculation performed before the apparatus enters the geographical margin; and
   (iii) obtain geo-specific spectrum usage data corresponding to an adjacent geographical area via a signaling exchange with a database server remote to the apparatus, when the apparatus starts to enter the geographical margin.

9. A computer program product comprising a computer usable non-transitory medium having computer readable program code embodied in said medium, comprising:
   (i) code for determining a current geo-location of an apparatus and obtain a geographical area and geo-specific spectrum usage data associated with the current apparatus location, via a signaling exchange with a database server remote from the apparatus;
   (ii) code for calculating a geographical margin for the current geographical area, the geographical margin defining an outer area of the geographical area, the calculation performed before the apparatus enters the geographical margin; and
   (iii) code for obtaining geo-specific spectrum usage data corresponding to an adjacent geographical area via a signaling exchange with a database server remote to the apparatus, when the apparatus starts to enter the geographical margin.

10. A database server, the database server configured to:
receive location data from an apparatus remote to the database server via a signaling exchange with the apparatus, the location data comprising the current geographical location of the apparatus;
determine a current geo-location of the apparatus and obtain a geographical area and geo-specific spectrum usage data associated with the current apparatus location, via a signaling exchange with a database server remote from the apparatus;
calculate a geographical margin for the current geographical area, the geographical margin defining an outer area of the geographical area, the calculation performed before the apparatus enters the geographical margin; and
transmit to the apparatus geo-specific spectrum usage data corresponding to an adjacent geographical area via a signaling exchange with the apparatus, when the apparatus starts to enter the geographical margin.

11. A system comprising a database server and an apparatus remote from the database server, wherein the apparatus is configured to:
determine a current geo-location of the apparatus and obtain a geographical area and geo-specific spectrum usage data associated with the current apparatus location, via a signaling exchange with a database server remote from the apparatus;
calculate a geographical margin for the current geographical area, the geographical margin defining an outer area of the geographical area, the calculation performed before the apparatus enters the geographical margin; and
obtain geo-specific spectrum usage data corresponding to an adjacent geographical area via a signaling exchange with a database server remote to the apparatus, when the apparatus starts to enter the geographical margin.

12. A system comprising a database server and an apparatus remote from the database server, wherein the database server is configured to:
receive location data from the apparatus, the location data comprising the current geographical location of the apparatus;
determine a current geo-location of the apparatus and obtain a geographical area and geo-specific spectrum usage data associated with the current apparatus location, via a signaling exchange with the apparatus remote from the database server, within which geo-specific spectrum usage data are known by the-apparatus;
calculate a geographical margin for the current geographical area, the geographical margin defining an outer area of the geographical area, the calculation performed before the apparatus enters the geographical margin; and
transmit to the apparatus geo-specific spectrum usage data corresponding to an adjacent geographical area via a signaling exchange with the apparatus remote to the database server, when the apparatus starts to enter the geographical margin.

13. A processor for an apparatus, the processor configured to:
determine a current geo-location of the apparatus and obtain a geographical area and geo-specific spectrum usage data associated with the current apparatus location, via a signaling exchange with a database server remote from the apparatus;
calculate a geographical margin for the current geographical area, the geographical margin defining an outer area of the geographical area, the calculation performed before the apparatus enters the geographical margin; and
based on the direction of movement, retrieve geo-specific spectrum usage data corresponding to an adjacent geographical area via a signaling exchange with a database server remote to the apparatus, when the apparatus starts to enter the geographical margin.

14. A processor according to claim 13, wherein the current geographical area is divided into an array of cells separated by cell boundaries, and wherein the direction of movement of the apparatus is based on the apparatus crossing a particular cell boundary.

15. A processor according to claim 13, wherein some of the known geo-specific spectrum usage data is replaced by the retrieved geo-specific spectrum usage data such that the size of the current geographical area before and after retrieval of the geo-specific spectrum usage data is the same.

16. A processor according to claim 13, wherein the processor is configured to:
determine a geographical margin for the current geographical area based on the direction of movement of the apparatus, the geographical margin defining an outer area of the geographical area; and
obtain geo-specific spectrum usage data corresponding to an adjacent geographical area from a location remote to the apparatus when the apparatus location is within the geographical margin.

* * * * *